United States Patent [19]
Heumann

[11] Patent Number: 6,002,739
[45] Date of Patent: Dec. 14, 1999

[54] COMPUTED TOMOGRAPHY WITH ITERATIVE RECONSTRUCTION OF THIN CROSS-SECTIONAL PLANES

[75] Inventor: John M. Heumann, Loveland, Colo.

[73] Assignee: Hewlett Packard Company, Palo Alto, Calif.

[21] Appl. No.: 09/067,663

[22] Filed: Apr. 28, 1998

[51] Int. Cl.$^6$ .................................................. G01N 23/04
[52] U.S. Cl. .................................. 378/8; 378/21; 378/901
[58] Field of Search ............................. 378/4, 8, 21, 901

[56] References Cited

U.S. PATENT DOCUMENTS

| | | | |
|---|---|---|---|
| 4,852,131 | 7/1989 | Armistead | 378/4 |
| 4,926,452 | 5/1990 | Baker et al. | 378/22 |
| 5,259,012 | 11/1993 | Baker et al. | 378/21 |
| 5,291,535 | 3/1994 | Baker et al. | 378/22 |
| 5,400,255 | 3/1995 | Hu | 364/413.19 |
| 5,454,019 | 9/1995 | Migita et al. | 378/15 |
| 5,461,651 | 10/1995 | Tam | 378/4 |
| 5,483,567 | 1/1996 | Swerdloff | 378/4 |
| 5,654,995 | 8/1997 | Flohr | 378/10 |
| 5,708,691 | 1/1998 | Zmora | 378/4 |

OTHER PUBLICATIONS

"Finite Series–Expansion Reconstruction Methods" by Yair Censor; Proceedings of the IEEE, vol. 71, No. 3; Mar. 1983; pp. 409–419.

"Reconstruction Algorithms: Transform Methods" by Robert M. Lewitt; Proceedings of the IEEE, vol. 71, No. 3; Mar. 1983; pp. 390–408.

"Cone–beam tomography: recent advances and a tutorial review" by Bruce D. Smith; Optical Engineering, vol. 29, No. 5; May 1990; pp. 524–534.

"Selective plane removal in limited angle tomographic imaging" by D.N.Ghosh, et al.; Med.Phys. vol. 12, No. 1; Jan./Feb. 1985; pp. 65–70.

"A multiple projection method for digital tomosynthesis" by Z. Kolitsi, et al.; Med. Phys., vol. 19, No. 4; Jul./Aug. 1992; pp. 1045–1050.

"Fourier Methods in 3D–Reconstruction from Cone–Beam Data" by Caroline Jacobson; Linkoping Studies in Science and Technology; Dissertations No. 427; 1996; pp. 3–56.

*Primary Examiner*—David Vernon Bruce
*Attorney, Agent, or Firm*—Augustus W. Winfield

[57] ABSTRACT

A cone-beam tomographic system in which computation speed is improved by reducing the reconstructed images to thin planes. Reducing the images to thin planes reduces the number of picture elements to be computed, and reduces basis functions to a simple function of the angle of a ray relative to a plane. In a variation, computation speed is further improved by making pixel size inversely proportional to the distance of a plane from an emissions source. As a result of the variable pixel size, for each projection, a ray intersecting the center of a sensor element intersects the center of exactly one pixel in each object plane.

7 Claims, 11 Drawing Sheets

COMPUTED TOMOGRAPHY WITH ITERATIVE RECONSTRUCTION OF THIN CROSS-SECTIONAL PLANES

FIELD OF INVENTION

This invention relates generally to computed reconstruction of a cross-sectional image from multiple views, and more specifically to computed tomography, and especially to cone-beam computed tomography.

BACKGROUND OF THE INVENTION

The technique of reconstructing a cross-sectional image of an object from multiple projections is broadly referred to as tomography. In a typical example application, a radiation source projects X-wavelength radiation through an object onto an electronic sensor array. By providing relative movement between one or more of the object, the source, and the sensor array, multiple views are obtained. An image of a slice through the object or a three-dimensional image of the object may then be approximated by use of proper mathematical transforms of the multiple views. Perhaps the best known practical application is the medical computerized tomography scanner (CT Scanner, also called computer-aided tomography or computerized axial tomography (CAT)). Tomography is also of interest in automated inspection of industrial products. However, because of cost, speed, or the mechanics required to obtain multiple images, many of the approaches to tomography that are suitable for medical applications are not suitable for a manufacturing environment. For example, consider inspection of solder joints for electronic assemblies in a production environment. There are many solder joints to be inspected, and the required test time is short. Ideally, the inspection process is in real time, as part of a feedback control system for the manufacturing process. In many manufacturing environments there is a need to verify the integrity of tens of thousands of solder joints within one minute or less.

Within X-ray absorption tomography, a number of imaging techniques are applicable to reconstruction of cross-sectional slices. In laminography, the X-ray source and sensor are moved in a coordinated fashion relative to the object to be viewed so that portions of an object outside a selected focal plane lead to a blurred image at the sensor (see, for example, U.S. Pat. No. 4,926,452). Focal plane images are reconstructed in an analog averaging process. The advantage is that extensive computer processing of ray equations is not required for image reconstruction, which makes laminography relatively fast and economical. One disadvantage is that only one plane can be reconstructed at a time (a partial solution to this problem may be found in U.S. Pat. No. 5,259,012). Another disadvantage is that out-of-focus regions, while blurred, still appear in the laminographic image, leading to shadowing and reduced contrast. Since real objects typically extend above and below the selected focal plane, laminographic smear results. Finally, constructive reinforcement between out-of-focus images can lead to artifacts in the reconstruction that may be difficult to distinguish from genuine objects.

Tomosynthesis is an approximation to laminography in which multiple projections (or views) are acquired and combined. As the number of views becomes large, the resulting combined image becomes identical to that obtained using laminography with the same geometry. A major advantage of tomosynthesis over laminography is that the focal plane to be viewed can be selected after the projections are obtained by shifting the projected images prior to recombination. Tomosynthesis may be performed as an analog method, for example, by superimposing sheets of exposed film. In digital tomosynthesis, the individual views are divided into pixels, and digitized and combined via computer software. Like laminography, however, digital tomosynthesis suffers from the drawback that all layers of an object contribute to each reconstructed cross-section leading to shadowing artifacts and reduced contrast. Partial solutions to these problems are provided by approaches in which the only areas of the images that are selected are the areas having maximum intensity or minimum intensity. Constructive artifacts still result, however, and some constructive artifacts may even be emphasized by these approaches.

Fan-beam tomography is a version of computer-aided tomography. An X-ray source having a fan-shaped planar output is positioned on one side of an object to be viewed, and a single line of sensors is positioned on the opposite side of the object to be viewed. The source and the sensors are synchronously rotated in a plane, around the stationary object. Alternatively, the object may be rotated while the source and sensor remain stationary. For objects with relatively low absorption of X-rays (such as biological tissues), this method results in a satisfactory image of a slice through the object in the plane of rotation. A three-dimensional image of the object can be obtained by electronically "stacking" a series of adjacent slices. For electronic assemblies, the plane of rotation relative to the assembly may be important. Consider, for example, a printed circuit board with lead-based solder joints in the surface plane of the board. A fan-beam slice along the plane of solder joints is subject to substantial shadowing since each ray through the board may intersect many solder joints. In addition, X-rays with sufficient energy to pass through multiple lead solder joints may damage some components in the electronic assembly. Therefore, for an electronic circuit board, it is preferable for the path of the X-rays to be at a significant angle relative to the plane of the board, preferably such that any one ray path passes through at most one lead solder joint in any one image slice. Therefore, it is preferable for the plane of rotation to be approximately orthogonal to the plane of the board. This means that the distance from the source to the sensor must be greater than the width or height of the largest object to be viewed. As discussed further below, there are other scan paths that may be more convenient for large objects in an industrial environment. It is possible to image a printed circuit board by stacking fan-beam slices that are orthogonal to the plane of the board. However, it is useful to obtain data for all the solder joints within an area at one time, for example all the solder joints for one integrated circuit. In addition, in general, the image quality from stacked slices is not as high as the image quality that can be obtained from true three-dimensional tomography.

Three-dimensional computed tomography has the potential for more accurate image reconstruction than laminography or tomosynthesis, but at the expense of speed (computation time). Three-dimensional computed tomography typically requires many projections, and is computationally intensive. One approach to three-dimensional computer-aided tomography is to position an X-ray source having a cone-shaped three-dimensional ray output on one side of an object to be viewed, and to position a two-dimensional array of sensors on the opposite side of the object to be viewed, and to synchronously move the source/array relative to the object. There are many suitable scan paths. For complete reconstruction of an arbitrary object, the scan path must surround the object. For example, the source may be moved in orthogonal circles around the object to be viewed, or the source may be moved along a helical path or other path along a cylinder surrounding the object to be viewed. This approach, called cone-beam tomography, is preferable in many cases for reconstructing three-dimensional images, and is potentially preferable for electronic assembly analysis because of the resulting image quality.

A theoretical mathematical approach to reconstructing an object from its projections was developed by J. Radon in 1917, and the basic transforms are now referred to as Radon transforms. More recently, researchers have proposed various methods for cone-beam reconstruction. See, for example:

A. K. Louis and F. Natterer, "Mathematical Problems of Computerized Tomography," *Proceedings of the IEEE*, Vol. 71, No.3, pp 379–389 (March 1983).

R. M. Lewitt, "Reconstruction Algorithms: Transform Methods," *Proceedings of the IEEE*, Vol. 71, No.3, pp 390–408 (March 1983).

Y. Censor, "Finite Series-Expansion Reconstruction Methods," *Proceedings of the IEEE*, Vol. 71, No.3, pp 409–419 (March 1983).

B. D. Smith, "Cone-beam tomography: recent advances and a tutorial review," *Optical Engineering*, Vol. 29 No. 5, pp 524–534 (May 1990).

C. Jacobson, "Fourier Methods in 3D-Reconstruction from Cone-Beam Data," Ph.D. Dissertation, Dissertation No. 427, Department of Electrical Engineering, Linköping University, Linköping, Sweden (1996).

In general, each method involves various trade-offs such as image quality (approximations, noise, blurring, and artifacts) versus computation time and difficulty of obtaining the required views. There is an ongoing need for economical systems with improved computation speed while providing suitable image quality.

SUMMARY OF THE INVENTION

Multiple example embodiments are provided in which a set of approximations and associated methods reduce the computational complexity, and the amount of projection data to be processed for tomography. For many diagnostic purposes, a complete three-dimensional image reconstruction is not necessary, and a few cross-sectional planes may be sufficient. In each of the example embodiments, image reconstruction computation is simplified and made faster by restricting the reconstructed images to a relatively small set of thin cross-sectional planes. This reduces the number of image elements that must be computed, and simplifies the computation of the intersection of a ray with a image element. An improved method of dividing multiple planes into pixels for cone-beam projection further reduces computational complexity.

DETAILED DESCRIPTION OF THE PREFERRED EMBODIMENT OF THE INVENTION

Figure 1:
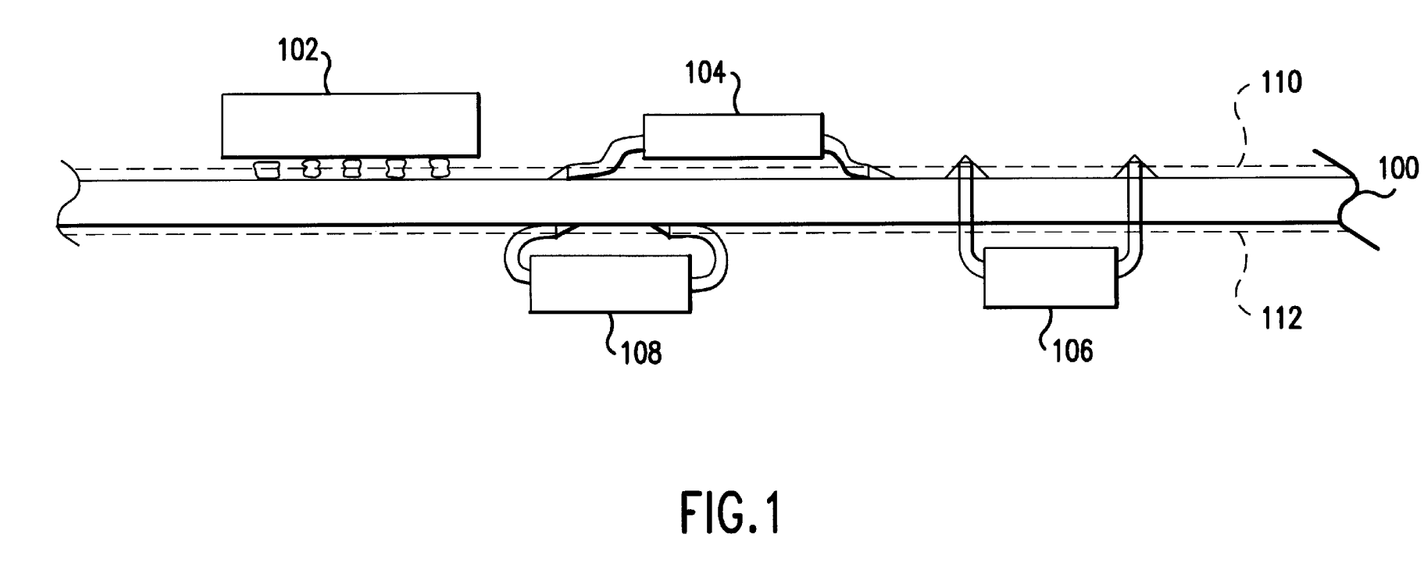
FIG. 1 is a cross-section view through a printed-circuit assembly illustrating planes of interest for viewing in accordance with the invention.

FIG. 1 depicts a printed circuit assembly illustrating an example application of the invention. In FIG. 1, a double-sided printed circuit board 100 has multiple components soldered to each of two exterior surfaces. Components 102 and 104 are mounted onto a first surface. Component 108 is mounted onto a second surface. Component 106 is a through-hole component mounted onto the second surface, but with leads that pass through both surfaces of board 100. Component 102 has a ball-grid array of solder joints. Component 104 illustrates a gull-wing surface mount device. Component 108 is a J-lead surface mount device. One plane, depicted by dashed line 110, just off the first surface of the circuit board 100 passes through the leads and solder fillets of components 102, 104 and 106. Another plane, depicted by dashed line 112, just off the second surface of the circuit board 100 passes through the leads and solder fillets of components 106 and 108. While it would be useful to have a three-dimensional image of each solder joint, image planes 110 and 112 provide sufficient information to determine that each component lead is present, and provide useful information for inspection of the various solder joints.

Figure 2:
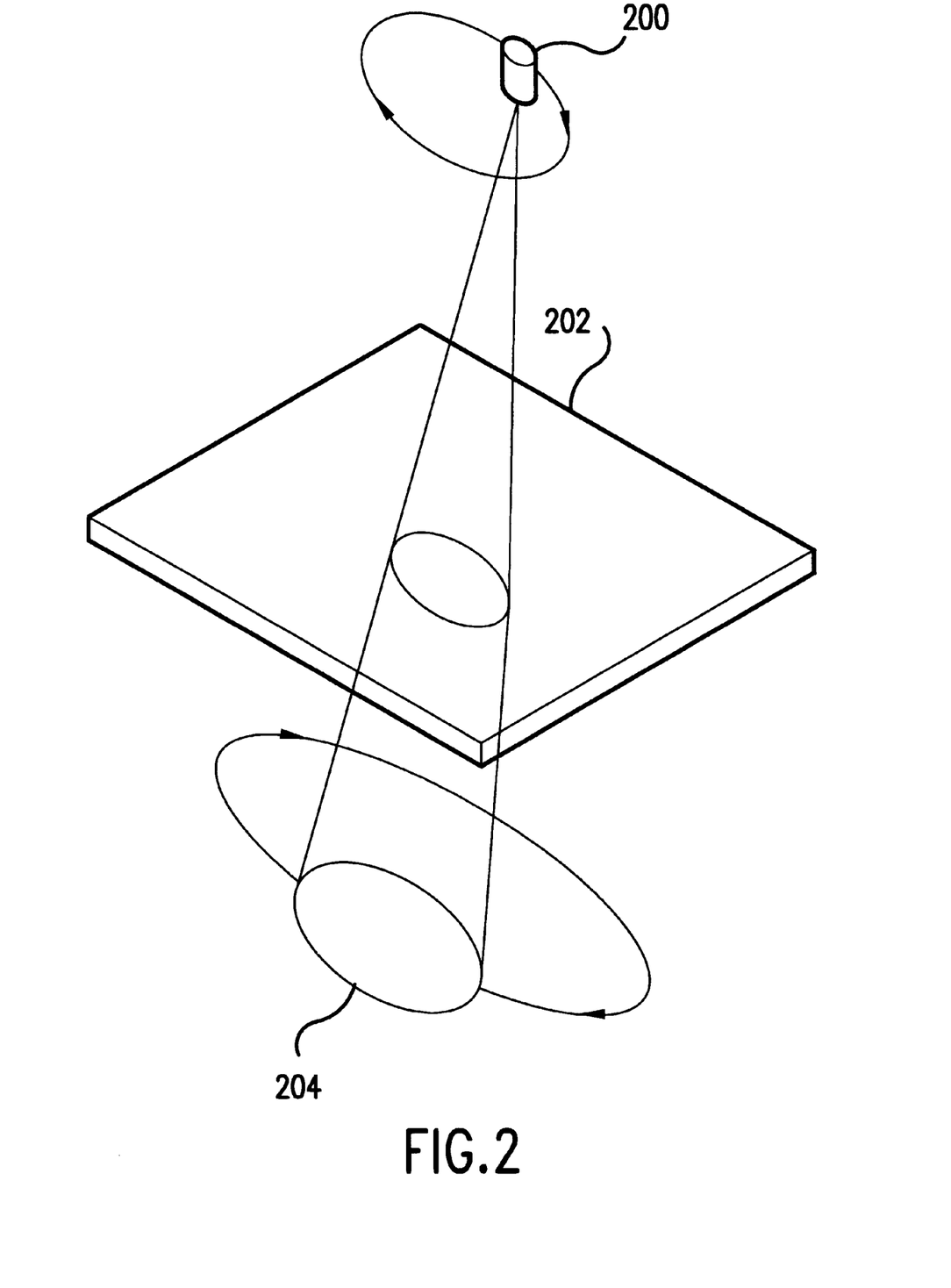
FIG. 2 is a perspective view of a circular scanned cone-beam computed tomography system.

FIG. 2 illustrates a cone-beam tomography system. An X-ray source 200 emits X-rays in a cone-shaped pattern. The X-rays pass through an object 202 to be imaged. The X-rays are sensed by an array of sensors 204. To obtain multiple views, the X-ray source 200 may travel in a circular path as illustrated, with the sensors 204 traveling in a coordinated circular path. Note that X-rays may be generated by bombarding the surface of an X-ray tube with an electron beam. By electronically deflecting the electron beam, the X-ray source is effectively moved. Note also that in the following discussion, the X-ray source is assumed to be sufficiently small to be treated as a point source. There are many other suitable movement paths for obtaining multiple images, and the following discussion is not limited to any particular movement path. Recall from the background section that for a complete three-dimensional reconstruction of an object, the scan path needs to surround the object. The path illustrated in FIG. 2 is not capable of providing data for an exact, mathematically complete, three-dimensional reconstruction of an arbitrary object 202. However, it provides sufficient data for practical application given the limited planes to be reconstructed as discussed below. In addition, note that the scan path illustrated in FIG. 2 is convenient for scanning large, nearly planar, objects. Large planar objects may be translated in two dimensions to provide imaging of different parts of the objects, without requiring the source and sensor to be moved completely around a large volume.

Figure 3:
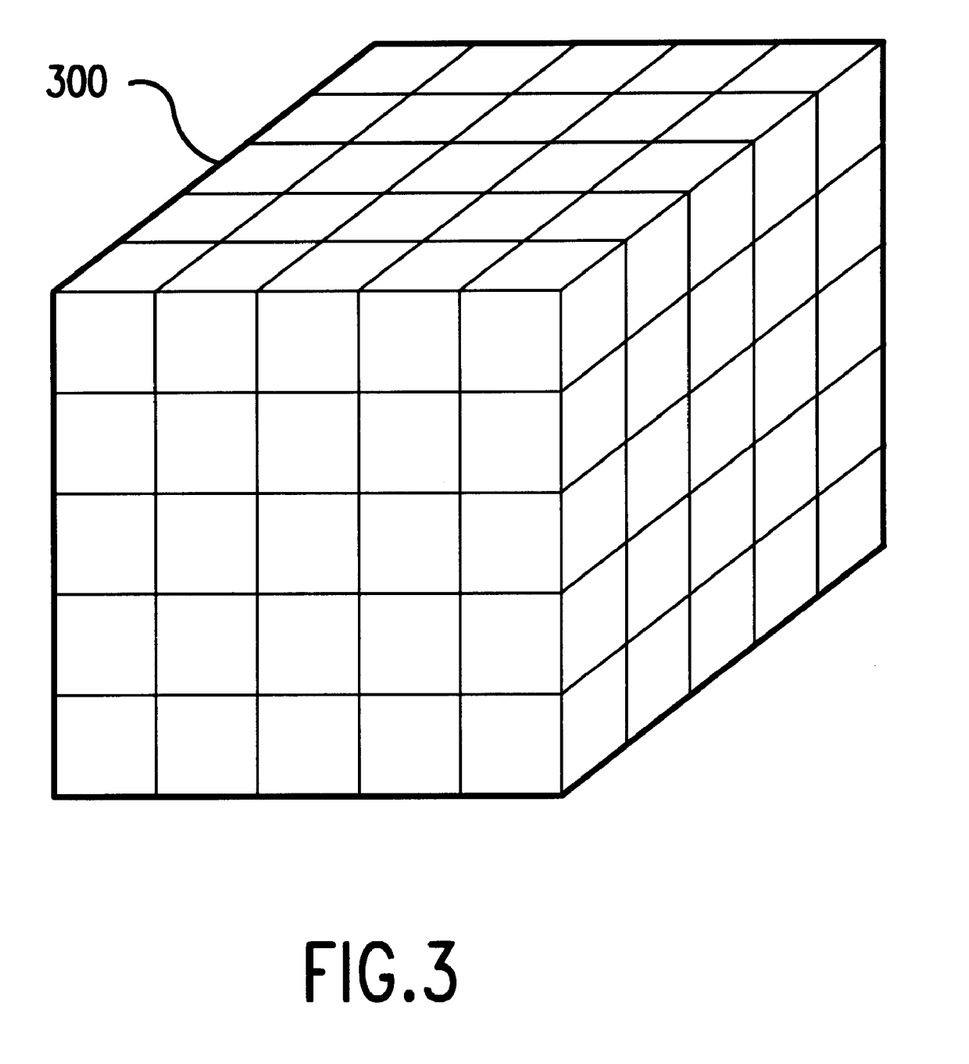
FIG. 3 is a perspective view of a cube that has been subdivided into cubic voxels.

Conventional digital tomography approximates an object by discrete volume elements, called voxels. FIG. 3 illustrates a cubical object 300 that has been divided into 125 (5×5×5) identically sized cubic voxels. For three-dimensional imaging of object 300, the density (or absorption coefficient, or material thickness) of each of the 125 voxels must be reconstructed from the data represented in multiple views of object 300 as detected by an array of sensors such as array 204 in FIG. 2.

Figure 4:
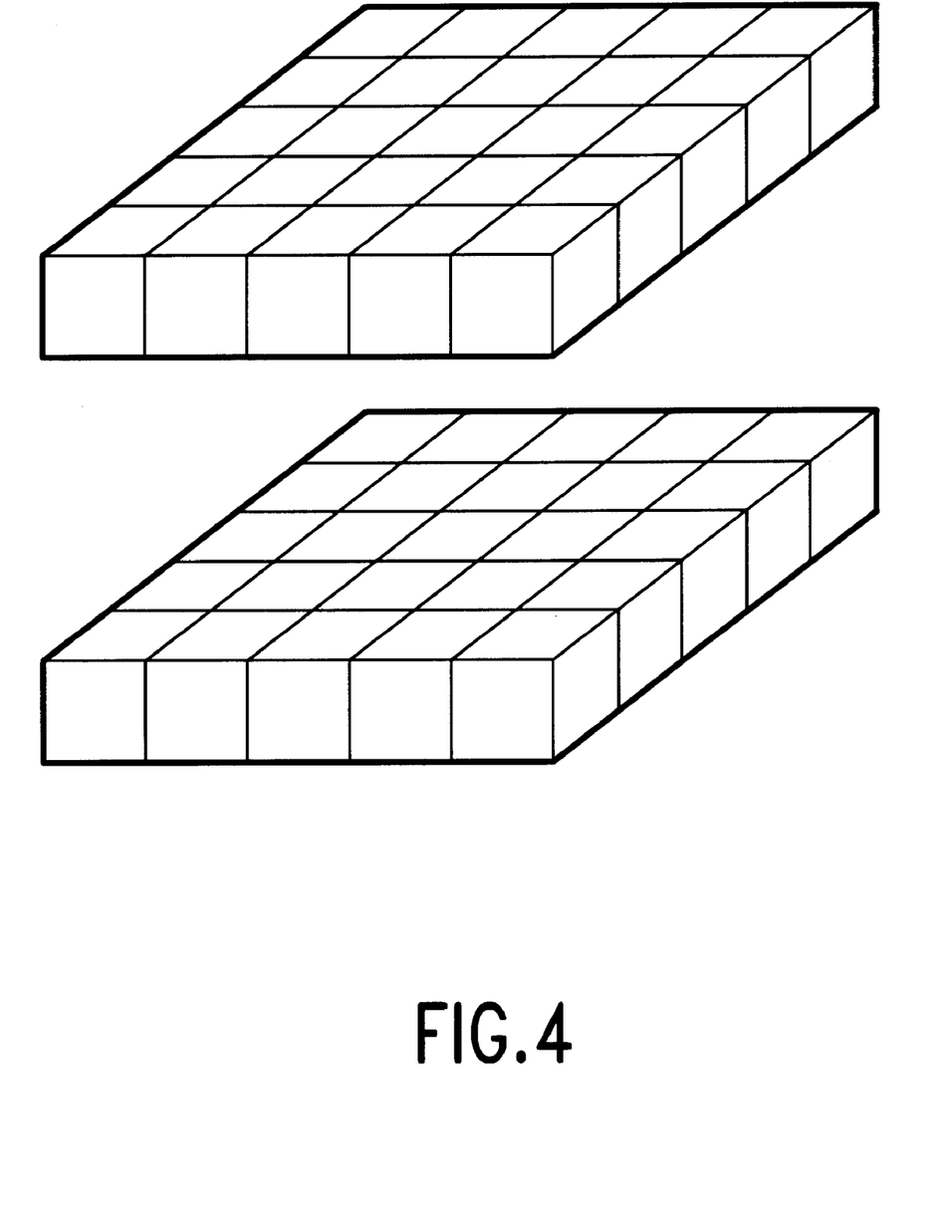
FIG. 4 is a perspective view of an object approximated by discontiguous layers.

For many applications, a complete three-dimensional image is not necessary. For example, for inspection of the double-sided circuit board of FIG. 1, two image planes (110 and 112) may be sufficient to determine solder joint quality. FIG. 4 illustrates two layers of voxels for the object 300 of FIG. 3. Note that in this patent document two layers will be used for simplicity, but the methods generalize to more than two layers. Note also that two parallel layers are illustrated, but the methods are applicable to non-parallel layers. Note that if only two layers, as illustrated in FIG. 4, provide sufficient image information for a particular application, the number of voxels to be reconstructed is substantially reduced. For the voxels represented in FIGS. 3 and 4, the number of layers is reduced from five to two, but in a typical application the number of layers could be reduced from hundreds or thousands of layers to a small number of layers (less than ten).

Figure 5:
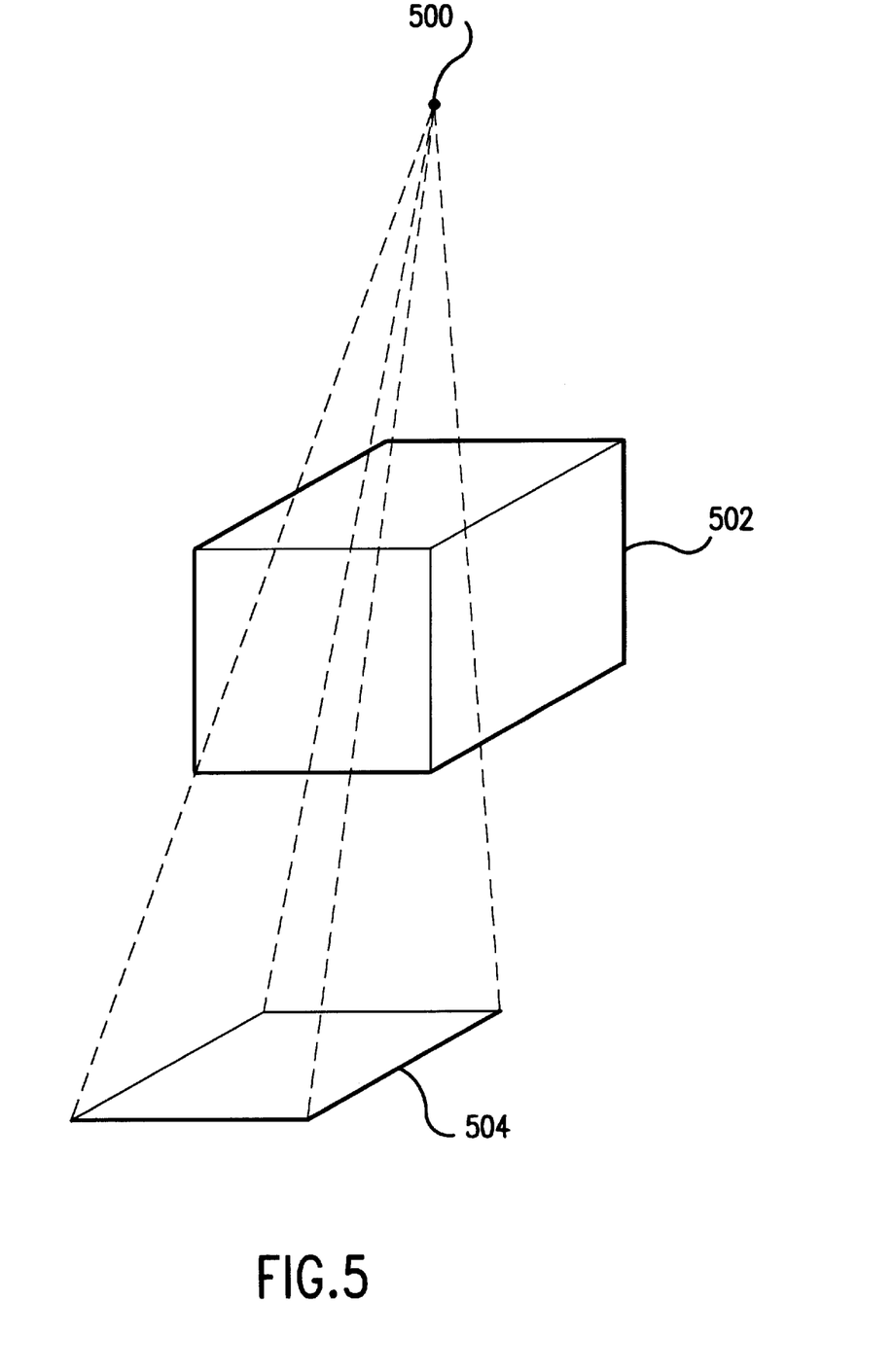
FIG. 5 is a perspective view of a voxel intersected by a volume of radiation.

FIG. 5 illustrates radiation from a point source 500 passing through a cubic voxel 502 onto a square sensor element 504. Lines connecting the four corners of the sensor element 504 to the point source 500 define a five-sided solid. Assume that voxel 502 is filled with a material having a uniform absorption. Then, in X-ray absorption imaging, the intersection of the five-sided radiation solid with the cubic voxel 502 determines the absorption due to voxel 502. Typically, radiation is modeled as a set of rays where each ray is a single line. The volume intersection of FIG. 5 is then obtained by integrating over all rays that intersect a voxel.

The relative attenuation of a monochromatic ray of X-radiation as it passes through an absorbing material (in the non-diffracting case) is given by the following equation:

$$\frac{I}{I_0} = e^{-\oint \sigma(r) dr}$$

Where: σ is the linear absorption coefficient, and the integral is computed along the beam path. Taking the natural log of both sides results in the following form:

$$-\ln\left(\frac{I}{I_0}\right) = \oint \sigma(r) dr$$

A discrete approximation to the line integral is typically used in practice, as follows:

$$y_i = \ln\left(\frac{I}{I_0}\right)_i = \sum a_{ij} x_j \quad \text{(Equation 1)}$$

where $y_i$ is a measured projection, $a_{ij}$ is a basis function (a measure of the intersection between ray i and voxel j, which given a straight line ray, and uniform absorption within a voxel, is the path length of the ray i through the voxel j), and $x_j$ is the effective linear absorption coefficient within the voxel (unknown).

Each ray of each projection leads to a single equation similar to equation 1. The resulting system of equations will typically not be linearly independent. There have been many proposals for methods for approximate solutions to the resulting systems of equations. See, for example, the article by Lewitt, and the article by Censor, referenced in the background section. Transform methods, such as Fourier methods and filtered backprojection, rely on discrete approximations to solutions of the inverse Radon transform. In contrast to transform methods are series-expansion methods which take as their starting point a set of discrete ray equations as in equation 1. Examples of series-expansion methods include direct inversion or pseudo-inversion of the discrete ray equations in addition to iterative methods such as the Algebraic Reconstruction Technique (ART). Variations include Simultaneous Iterative Reconstructive Technique (SIRT), Simultaneous Algebraic Reconstruction Technique (SART), Maximum Entropy (MENT) and many others. In this patent document, a SIRT-like method is used for illustration.

Figure 6:
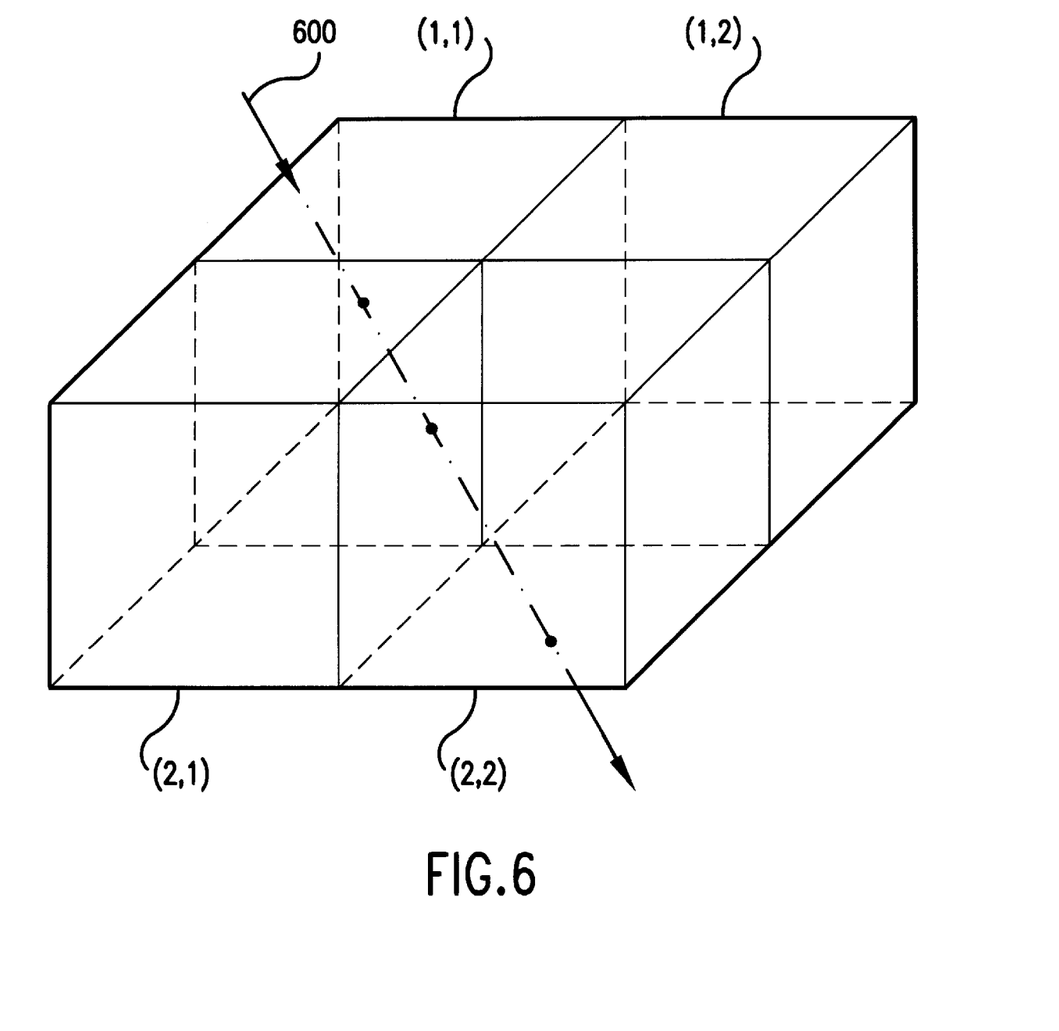
FIG. 6 is a perspective view of a single layer of an object illustrating a ray intersecting multiple voxels.

A single ray can interact with multiple voxels in a single layer of voxels, since a ray can enter and leave a voxel by any of its six faces (surfaces), or any of its eight vertices, or any of its twelve edges. In FIG. 6, for example, a single ray 600 intersects two of the four voxels illustrated. Ray 600 enters the top face of voxel ((2,1), passes through the common face between voxels (2,1) and (2,2), and exits from the bottom face of voxel (2,2). Assuming a straight line ray and uniform absorption within a voxel, the basis function for a ray is the path length of the ray within a voxel. As a result, the basis functions ($a_{ij}$) must be computed separately for each ray and each voxel. Even with a two-layer approximation, no simple relation exists between the basis functions for a given ray in the top and bottom layers. Suppose, however, that the layers in FIG. 4 are allowed to become infinitely thin. In the limit as the thickness approaches zero, each layer approximates a plane, and the voxels are replaced with two dimensional pixels. Then, the probability of a ray entering or leaving through a face other than the top or bottom face approaches zero, and computation of the basis functions is greatly simplified. Each ray then intersects exactly one pixel per layer, and the path length within the pixel depends only on the angle of the ray and not the layer. In particular, the basis function becomes proportional to $1/\cos(\phi)$ where $\phi$ is the azimuth angle of the ray (the angle of the ray relative to the surface normal). The resulting basis functions may be computed on the fly or may be pre-computed and stored.

In interpreting the reconstructed cross-sectional image, the absorbing material is assumed to be concentrated in a thin layer, even though the actual distribution may be spread over a much greater thickness. Physically correct values of absorption must be non-negative, and must be less than or equal to the product of the linear absorption coefficient and the maximum path length within the voxel prior to the thin-layer approximation. As a result, for multiple thin layer approximation, algebraic reconstruction techniques are preferred over transform methods, because in algebraic reconstructions constraints on the absorption values can be incorporated during updating.

Figure 7:
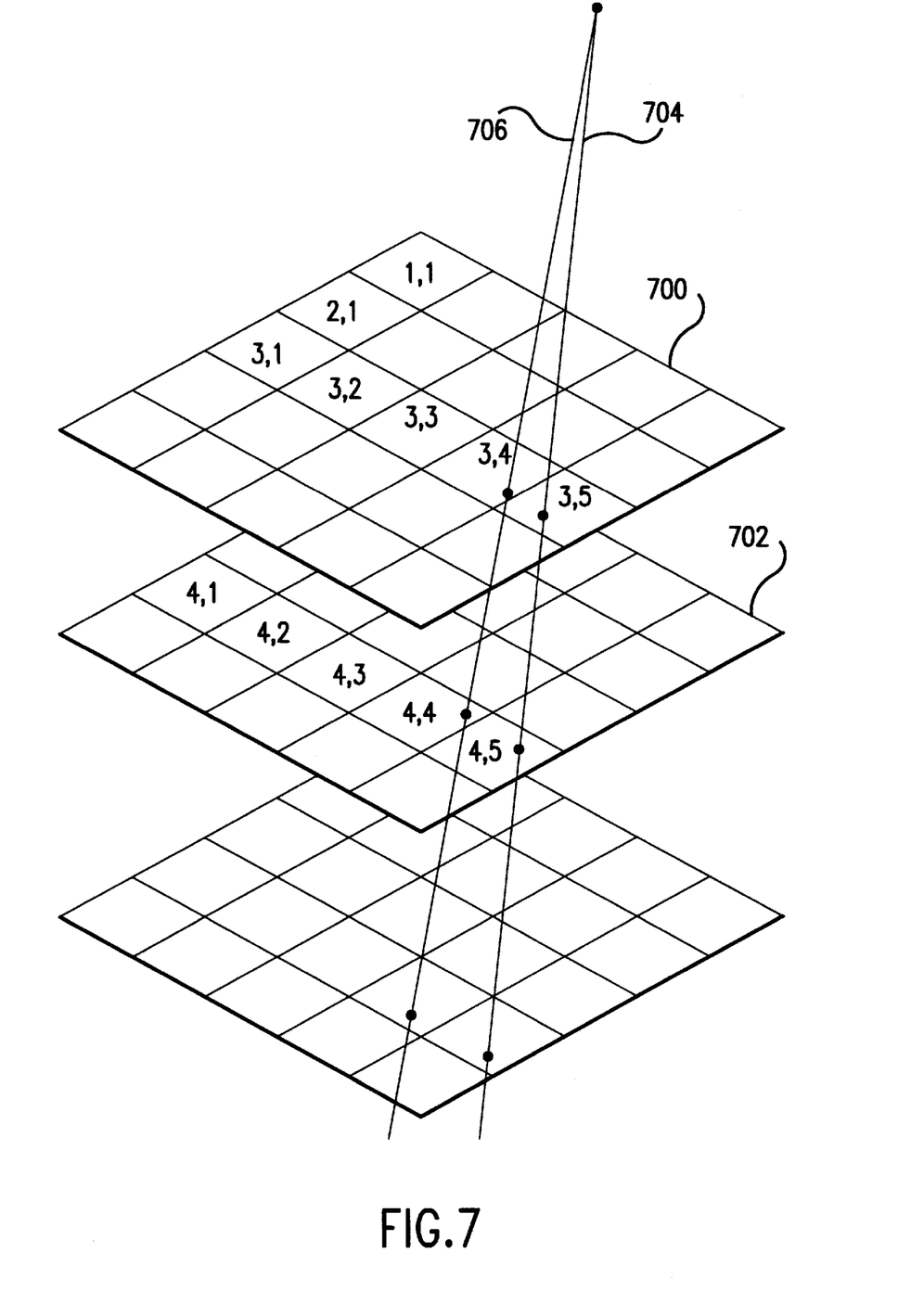
FIG. 7 is a perspective view of a cone-beam computed tomography system with an object approximated by discontiguous thin planes in accordance with the invention.

FIG. 7 illustrates a cone-beam system with two thin planes (700, 702) and part of a sensor array 708. Sensor array 708 is depicted as having 5×5 elements for simplicity of illustration, but in a typical system the detector array may be on the order of 2,048 by 2,048 elements. In general, in FIG. 7, a ray does not intersect corresponding numbered pixels in each plane. Note that ray 704 intersects pixel (3,5) for plane 700, and intersects pixel (4,5) for plane 702. Similarly, ray 706 intersects pixel (3,4) for plane 700, and intersects pixel (4,4) for plane 702. In FIG. 7, pixels within each plane are all depicted as having the same size. Alternatively, relatively small pixels may be used in areas of interest, and larger pixels may be used outside an area of interest. In general, there is no particular required relationship between the size of an element in the sensor array 708 and the size of a pixel in an object plane. Note also that it is common to group elements of the sensor array into larger sensing areas. For example, the sensor array may be divided in areas of 2×2 sensor elements for larger effective sensor element size. In the following discussion, "effective sensor element" refers to a single sensor element or to a group of elements being treated as a single sensor element.

Computation can be further simplified if each of the planes is permitted to have a different pixel size determined by magnification at each plane (magnification is inversely proportional to distance from the source). In particular, computation is simplified if each plane has a pixel size such that, in a particular projection, for a particular value of I and J, a ray intersecting the center of a particular effective sensor element (I,J) intersects the center of pixel (I,J) on every object plane.

Figure 8:
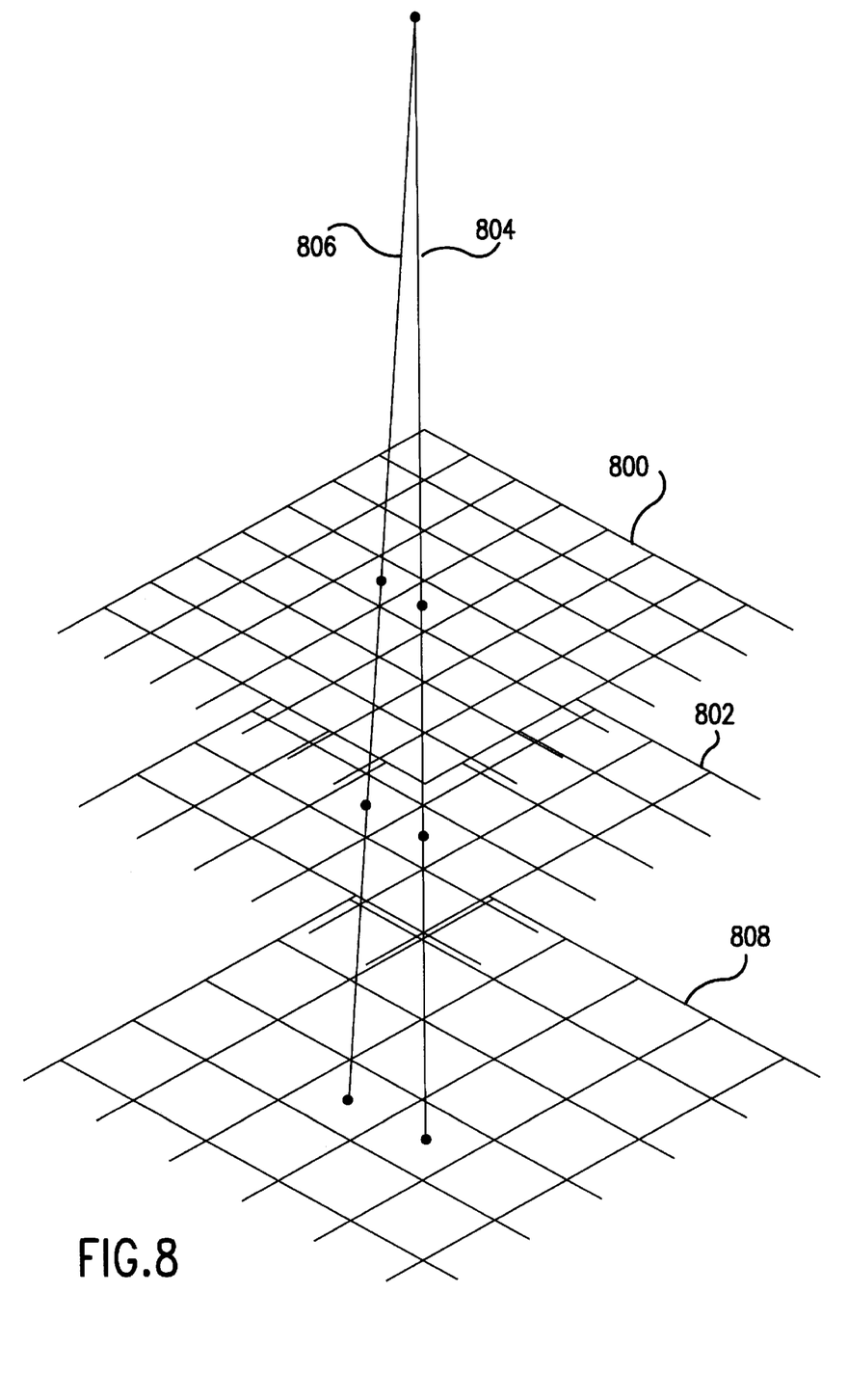
FIG. 8 is a perspective view of a cone-beam computed tomography system with an object approximated by discontiguous thin planes with the planes having different pixel densities in accordance with the invention.

FIG. 8 illustrates a cone-beam system for which a ray intersects the same corresponding pixels for every object plane. In FIG. 8, a coordinate origin, and pixel size on each of the object planes, are defined such that a ray from a point source to the center of effective sensor element (I,J) passes through the center of element (I,J) on each object plane. Ray 804 intersects effective element (4,4) of sensor array 808, and intersects pixel (4,4) on object planes 800 and 802. Ray 806 intersects effective element (4,3) on sensor array 808, and intersects pixel (4,3) on object planes 800 and 802. Pixels on object plane 800 are proportionally smaller than pixels on object plane 802. Pixels on object plane 802 are proportionally smaller than effective sensor elements in sensor array 808. Note that with the geometry shown, planes 800 and 802 will have a different origin for each projection. Consider the problem of intersection of a radiation solid consisting of a set of rays (as in illustrated in FIG. 5) for the system of FIG. 8. In FIG. 8, each effective sensor element in sensor array 808 in conjunction with a point source defines a three-dimensional solid of radiation that subsumes exactly the area of one pixel in each object plane. Therefore, in contrast to the systems illustrated by FIGS. 5 and 7, the system of FIG. 8 substantially simplifies integration of rays over an area of intersection with a pixel since basis functions are identical for corresponding pixels in each plane. In practice, it may be sufficient to approximate basis functions as proportional to $1/\cos(\phi)$. For each pixel, the area of intersection with the radiation impinging on the effective sensor element is always exactly the area of the pixel.

Figure 9:
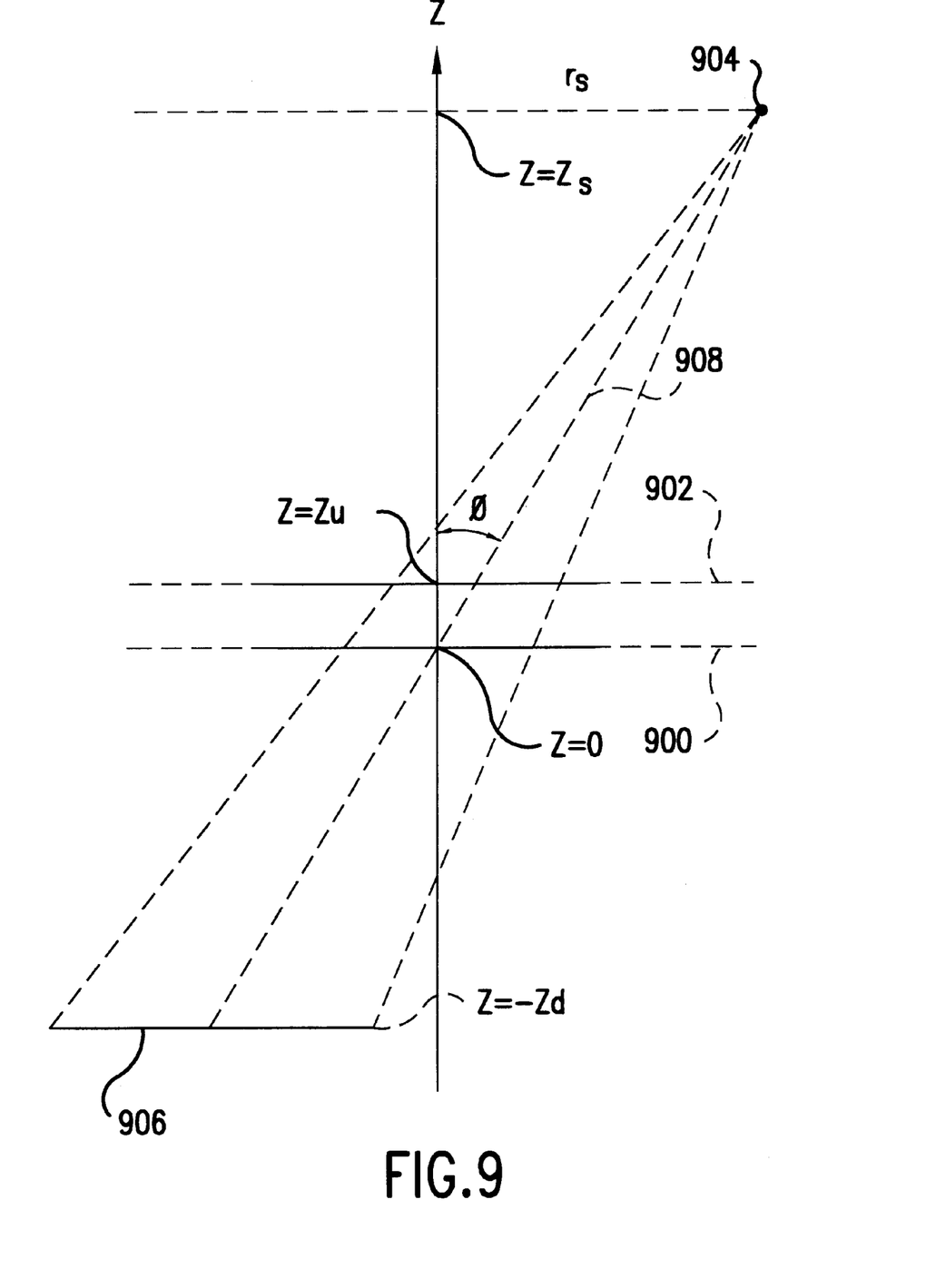
FIG. 9 is a side view of the cone-beam computed tomography system of FIGS. 7 and 8 illustrating various definitions for equations.

FIG. 9 illustrates some of the mathematical relationships for an arrangement as illustrated in FIG. 8 with two parallel object planes. In FIG. 9 there is a lower object plane 900 and an upper object plane 902. Within each object plane there is region of interest indicated by a solid line within each object plane. The object to be imaged may extend beyond the region of interest, as indicated by dashed lines in the object planes. For example, for a printed circuit board that may be on the order of 300 mm by 300 mm in total area, a region of interest for imaging may be in the range of 5 mm by 5 mm up to 30 mm by 30 mm. The overall object is then scanned by moving the region of interest, either by moving the source and sensor array or by moving the object. A coordinate system is chosen so that the z-axis is normal to the two object planes, and centered on the region of interest. The lower object plane 900 is at z=0, the upper object plane 902 is at $z=z_u$, the source 904 is at $z=z_s$, and the sensor array 906 is at $z=-z_d$. Dashed line 908 connects the point source 904 to the center of the sensor array 906. Note that dashed line 908 passes through z=0, and that $\phi$ is the angle of a ray (for example, 908) relative to the z-axis.

There are P projections. For each projection, the entire region of interest of the lower object plane 900 is imaged. For each projection, an area is imaged on the upper object plane 902 that is slightly smaller than the region of interest. For the upper object plane 902, a superset of the entire region of interest is imaged by the union of the P projections. Each projection images M×N pixels on each object plane. Assuming a circular scan, for the ith projection, the source 904 is positioned at an angle of:

$$2\pi \frac{i-1}{P},$$

in the plane of $z=z_s$, at a distance $r_s$ from the z-axis. The sensor array 906 is centered at $$r_d = \frac{r_s z_d}{z_s}$$

in the plane $z=-z_d$, at an angular position that is complementary to the angular position of the source. Calibration may be performed to correct for variations in illumination and sensor element sensitivity. The ray projection equations are linearized by taking the logarithm of the relative intensity $(-\ln(I/I_o))$.

Each projection images M×N pixels in the lower object plane 900 with a magnification of $$\frac{z_s + z_d}{z_s}.$$

Each projection images M×N pixels in the upper object plane 902 with a magnification of $$\frac{z_s + z_d}{z_s - z_u}.$$

Note that magnification is one at the sensor array, and increases as a plane approaches the source.

The center of the projection for the upper object plane 902 is shifted by $$\delta = \frac{r_s}{\varepsilon} \left(\frac{z_u}{z_s}\right)\left(\frac{z_s + z_d}{z_s - z_u}\right)$$

pixels away from the z-axis where $\varepsilon$ is the linear size of an edge of an effective sensor element (note that square pixels are assumed for purposes of illustration, but are not required). The total number of pixels in the region of interest in the lower object plane, and the total number of sensors in the sensor array 906, is M×N. The total number of pixels in the region of interest in the upper object plane 902 is $(M+2\delta)\times(N+2\delta)$.

As described above, the basis function $(a_{ij})$ for both pixels intersected by a single ray are equal and determined solely by the azimuthal angle $\phi$. As described above (equation 1), a discrete form of the ray equation is:

$$y_i = \Sigma a_{ij} x_j$$

or, y=Ax, where a bold lower case character designates a vector, and a bold upper case character designates a matrix.

A typical iterative approach to solving the ray equations is as follows:

$$x(k+1) = x(k) + \lambda_k \frac{y_i - [a_i \cdot x(k)]}{a_i \cdot a_i} a_i$$

Where i is a projection number, x is a column vector of absorption values, $y_i$ is a column vector of natural logs of relative intensity measurements, $a_i$ is the transpose of the ith row of the M×N matrix of basis functions A=($a_{ij}$), and $\lambda_k$ is a step size or relaxation constant for the kth iteration ($0<\lambda_k<2$). Each pixel of each object plane is updated at every iteration, and corrections are averaged over all rays and projections before changes are made to the values of x. Using a variable pixel size as discussed above with a ray through the center of each sensor pixel, no two rays in a single projection intersect the same pixel in a given object plane. By pre-computing all the rays that intersect a particular pixel, it is possible to order the computation by global pixels instead of by rays to minimize storage of accumulated corrections. With the values of x initialized to zero, and with a step size (λ) of two for the first iteration, and a step size of one thereafter, the above method yields good reconstructions in as few as three iterations. In one test case, the above method with pixels defined as in FIG. 8, and two reconstruction layers is more than an order of magnitude faster than a three-dimensional reconstruction, even when using a five-plane multiresolution approach with small voxels only at the two planes of interest, and fat voxels elsewhere.

For each iteration, after the correction values of x for each projection pixel are computed, the various projections for the upper plane 902 must be merged. One example method is as follows. The area of interest for the upper plane 902 is divided into (M+2δ)×(N+2δ) global pixels. The M×N pixels for a particular projection may not perfectly align with the global pixels. Each ray of each projection is treated as if it intersects the center of the global pixel that lies nearest the intersection of the ray with the plane of interest. Ties (that is, when the ray intersects the boundary between two or more adjacent global pixels) may be broken using any arbitrary deterministic method, so long as it is applied consistently. Alternatively, a correction value for a global pixel may be computed from correction values for pixels of individual projections by two-dimensional interpolation of correction values from neighboring projection pixels.

Figure 10A:
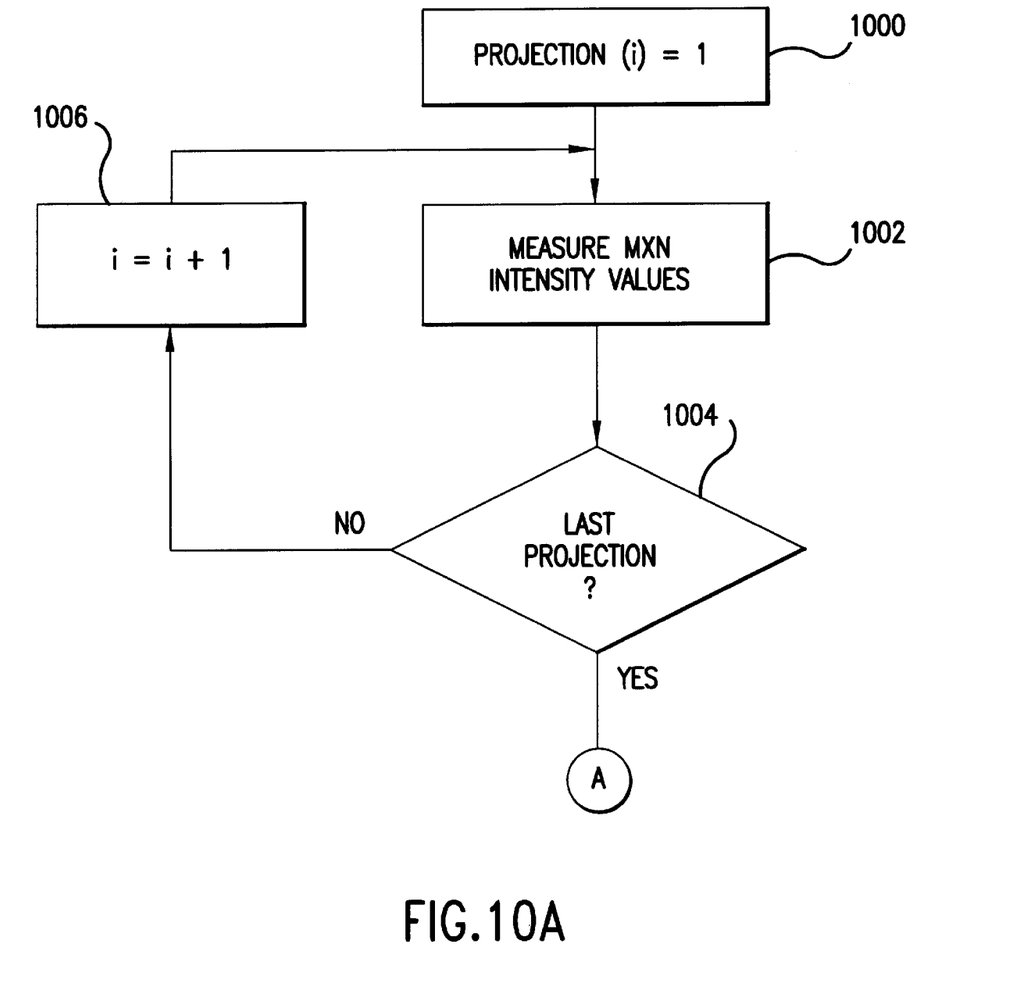
FIGS. 10A and 10B are flow charts of a method in accordance with the invention.
Figure 10B:
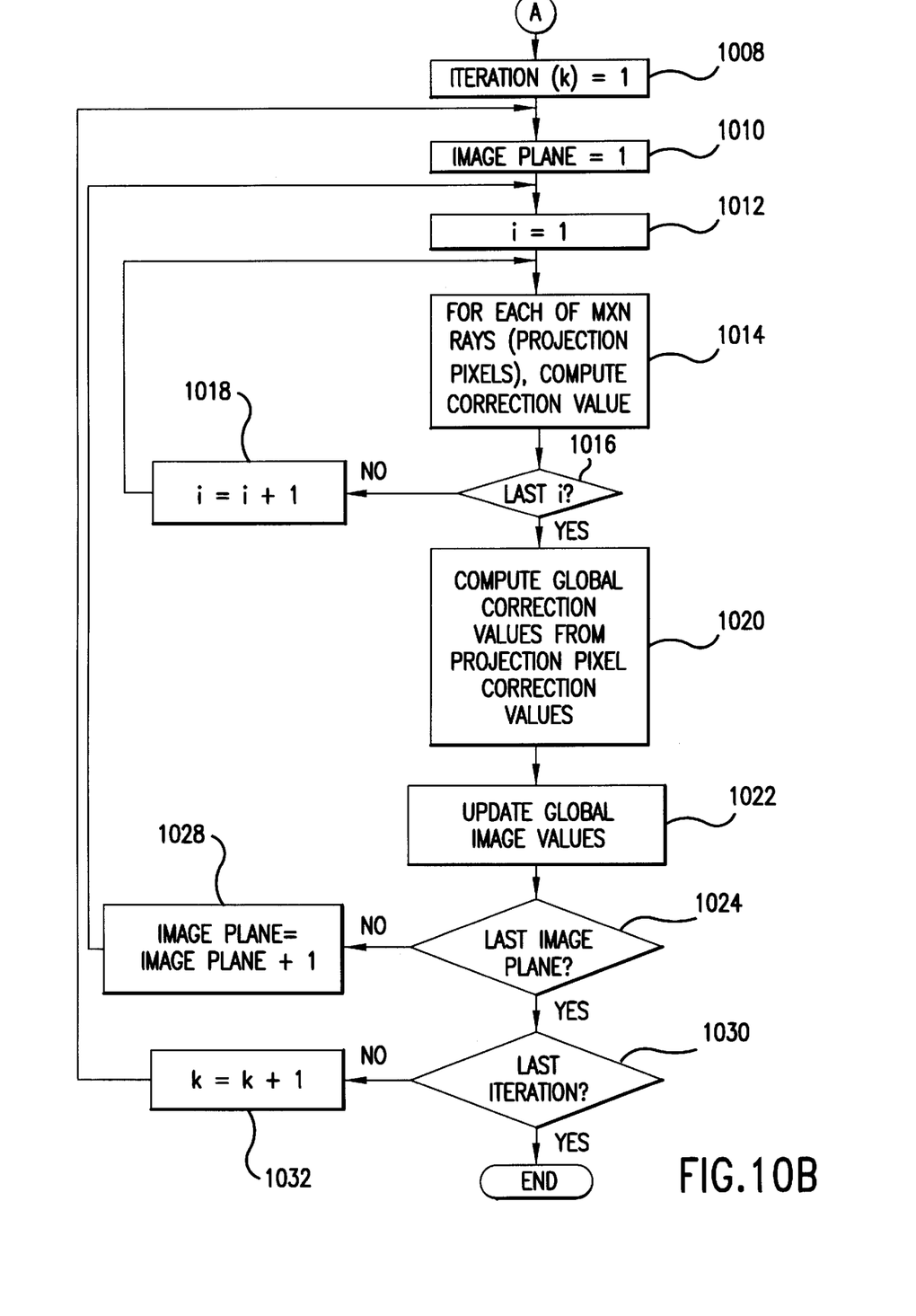

FIGS. 10A and 10B illustrate an example method. In FIG. 10A, for each projection (steps 1000, 1004 and 1006), M×N intensity values are measured by the M×N sensor array (step 1002). In FIG. 10B, for each iteration (steps 1008, 1030, and 1032), and for each image plane (steps 1010, 1024, and 1028), and for each set of measured projection data (steps 1012, 1016, 1018), correction values are computed for M×N projection pixels (step 1014). The correction values for each global pixel are then computed from correction values for projection pixels (step 1020) and for each global pixel, the correction value is added to the previous computed image value (step 1022). As noted above, as an alternative, it is possible to order the computation by global pixels instead of by rays without storing correction values for individual projections. Note also that it is not necessary for step 1020 to be an expressly separate step. In particular, if the correction value for a projection pixel is assigned to the nearest global pixel, then correction values for global pixels can computed directly in step 1014 without having to separately compute correction values for projection pixels.

For a system as in FIG. 8, computation is greatly simplified if the planes are parallel to the sensor array so that pixel size is uniform within a plane. However, for a system as in FIG. 7 where there is no relationship between effective sensor element size and object plane pixel size, the planes do not have to be parallel and planes may intersect outside the region of interest. Object planes may be parallel to the z axis or at any other orientation of interest.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for computing an image for a tomographic system, the method comprising the following steps:

approximating an object to be imaged as a plurality of planes, wherein the planes are at least partially non-adjacent, each plane comprising a plurality of voxels, each voxel having a top surface and a bottom surface opposite the top surface, wherein each plane is sufficiently thin so that there is essentially a zero probability of a ray entering or leaving a surface of any voxel other than the top surface or the bottom surface; and approximating a solution to ray equations for the planes.

2. The method of claim 1 wherein the planes are parallel.

3. The method of claim 1 wherein the planes do not intersect within a region of interest.

4. The method of claim 1 further comprising:

assigning a pixel size for each plane such that effective magnification at a particular plane is inversely proportional to the distance of the particular plane from a radiation source.

5. The method of claim 4 further comprising:

assigning pixel locations for each plane, in each projection, such that a line from the radiation source to a center of an effective sensor element passes through the center of a pixel in each plane.

6. The method of claim 5 further comprising:

dividing an overall area of interest in a particular plane into global pixels; assigning an initial image value to every global pixel;

computing, for each projection, on the particular plane, a correction value for each projection pixel;

determining a projection pixel that is physically nearest a particular global pixel; and correcting the image value of the particular global pixel by adding the correction value of the nearest projection pixel to the image value of the particular global pixel.

7. The method of claim 5 further comprising:

dividing an overall area of interest in a particular plane into global pixels;

assigning an initial image value to every global pixel;

computing, for each projection, on the particular plane, a correction value for each projection pixel;

determining a set of projection pixels that are physically near a particular global pixel;

interpolating the correction values of the set of projection pixels that are physically near a particular pixel to obtain a correction value at the location of the particular global pixel; and correcting the image value of the particular global pixel by adding the interpolated correction value for the particular global pixel to the image value of the particular global pixel.

* * * * *